US012434357B2

(12) United States Patent
Lee

(10) Patent No.: US 12,434,357 B2
(45) Date of Patent: Oct. 7, 2025

(54) RATCHET WRENCH

(71) Applicant: Tsan-Chang Lee, Taichung (TW)

(72) Inventor: Tsan-Chang Lee, Taichung (TW)

( * ) Notice: Subject to any disclaimer, the term of this patent is extended or adjusted under 35 U.S.C. 154(b) by 344 days.

(21) Appl. No.: 18/321,863

(22) Filed: May 23, 2023

(65) Prior Publication Data

US 2024/0391064 A1 Nov. 28, 2024

(51) Int. Cl.
*B25B 13/46* (2006.01)

(52) U.S. Cl.
CPC .................................. *B25B 13/463* (2013.01)

(58) Field of Classification Search
CPC .................................................... B25B 13/463
USPC ........................................................... 81/63.2
See application file for complete search history.

(56) References Cited

U.S. PATENT DOCUMENTS 5,533,427 A * 7/1996 Chow ................... B25B 13/463 81/63
7,121,170 B2 * 10/2006 Shen ..................... B25B 13/463 81/58
7,185,566 B2 * 3/2007 Arnold .................. B25B 13/463 81/63
9,440,336 B2 * 9/2016 Liu ......................... B25B 13/08
9,744,652 B2 * 8/2017 Liao ....................... B25B 13/463
11,331,774 B2 * 5/2022 Wypych ................ B25B 13/463
11,370,089 B2 6/2022 Lee

* cited by examiner

*Primary Examiner* — Hadi Shakeri
(74) *Attorney, Agent, or Firm* — LANWAY IPR SERVICES; Chun-Ming Shih

(57) ABSTRACT

A ratchet wrench includes a wrench body, a ratchet wheel, a pawl member, a direction control unit, a restriction member, and a retaining member. The wrench body has a first receiving recess, a second receiving recess, a first abutting face, a second abutting face, and a third receiving recess. The ratchet wheel has a ratchet portion. The pawl member has an engaging portion, a cavity, two first abutting portions, and two corners. The direction control unit includes a rotation member, a push member, and an elastic member. The rotation member is provided with a cylindrical block, a receiving chamber, two second abutting portions, a restriction groove, and a third face. The push member is provided with a push face. The restriction member is partially received in the restriction groove and has a recessed portion.

7 Claims, 9 Drawing Sheets

RATCHET WRENCH

BACKGROUND OF THE INVENTION

Field of the Invention

The present invention relates to a hand tool and, more particularly, to a ratchet wrench.

Description of the Related Art

A conventional ratchet wrench was disclosed in the U.S. Pat. No. 11,370,089, and comprises a main body 10, a ratchet wheel 20, a pawl member 30, a direction control unit 40, and a retaining ring 50.

However, the conventional ratchet wrench has the following disadvantages.

1. It is necessary to exactly calculate the position, radian, and angle between the limit channel 33, the limit face 34, and the projection 414, so that when the rotation member 41 is rotated, the projection 414 rests on the limit face 34 or is detached from the limit face 34 smoothly. The limit face 34 cannot fit the projection 414 easily. An error easily produces between the rotation member 41 and the pawl member 30.

2. When the drive knob of the rotation member 41 is moved to the first resting face 141 or the second resting face 142, the projection 414 will be detached from the limit face 34. When the projection 414 enters the limit face 34 again, the projection 414 easily hits the cavity 32 due to a working error so that the direction control unit 40 and the pawl member 30 are not fit exactly.

BRIEF SUMMARY OF THE INVENTION

In accordance with the present invention, there is provided a ratchet wrench comprising a wrench body, a ratchet wheel, a pawl member, a direction control unit, a restriction member, and a retaining member. The wrench body is provided with a first receiving recess, a second receiving recess, a first abutting face, a second abutting face, and a third receiving recess. The ratchet wheel has a ratchet portion. The pawl member is provided with an engaging portion, a cavity, two first abutting portions, and two corners. The direction control unit includes a rotation member, a push member, and an elastic member. The rotation member is provided with a cylindrical block, a receiving chamber, two second abutting portions, a restriction groove, and a third face. When the first side of the pawl member rests on an inner face of the second receiving recess, one of the two first abutting portions on the second side of the pawl member restricts one of the two second abutting portions. The push member is provided with a push face. The restriction member is partially received in the restriction groove and is provided with a recessed portion.

According to the primary advantages of the present invention, the restriction member is partially received in the restriction groove so that the direction control unit is pivotally mounted in the third receiving recess and restricted by the restriction member. Thus, the direction control unit is limited by the restriction member at any angle so that the direction control unit is pivotally mounted in the third receiving recess steadily. In addition, when the rotation member is rotated in the third receiving recess, the rotation member is moved in the recessed portion. Thus, the restriction member restricts the rotation member to prevent the rotation member from being rotated in the third receiving recess to an excessive extent. The two second abutting portions limit the maximum rotation angle of the rotation member in the recessed portion.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 2:
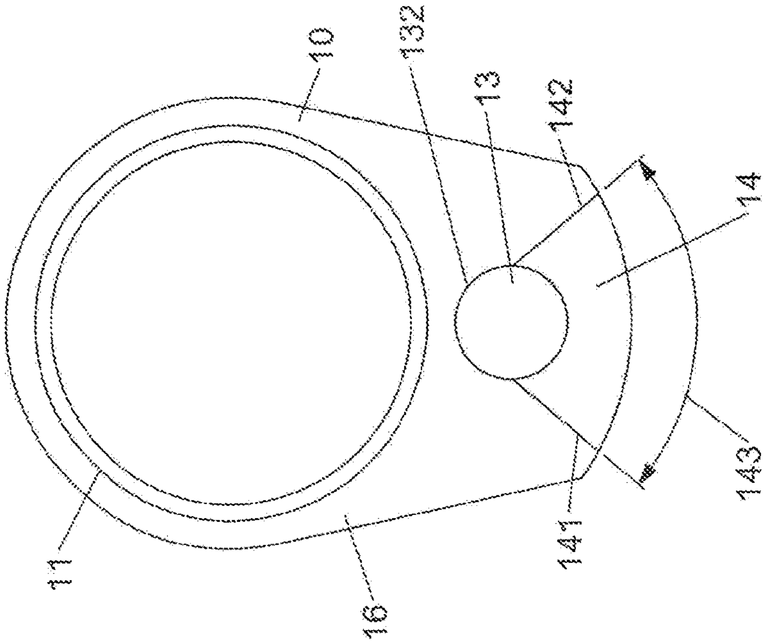
FIG. 2 is a top view of a wrench body of the ratchet wrench in accordance with the preferred embodiment of the present invention.
Figure 1:
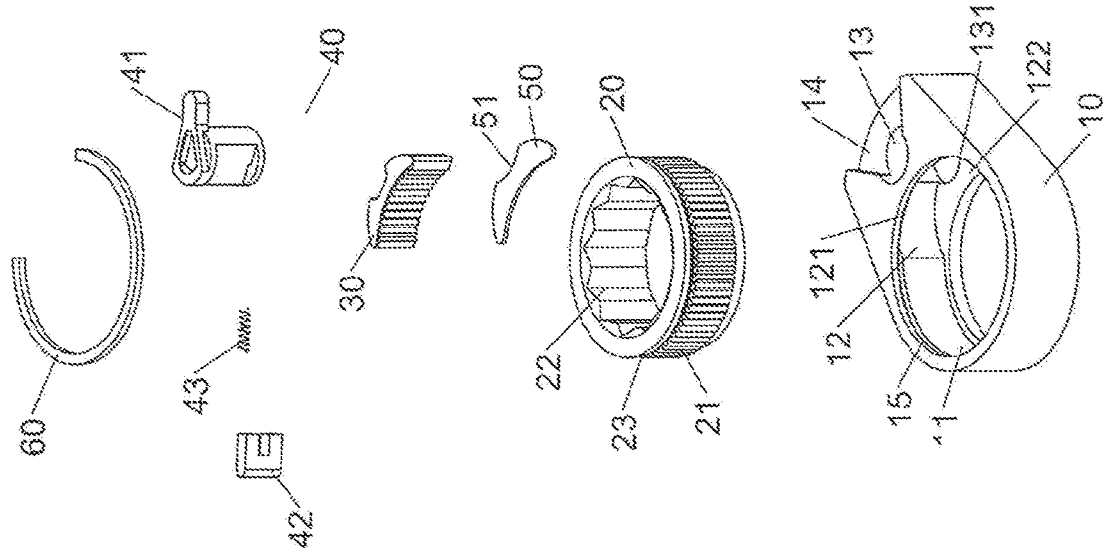
FIG. 1 is an exploded perspective view of a ratchet wrench in accordance with the preferred embodiment of the present invention.
Figure 4:
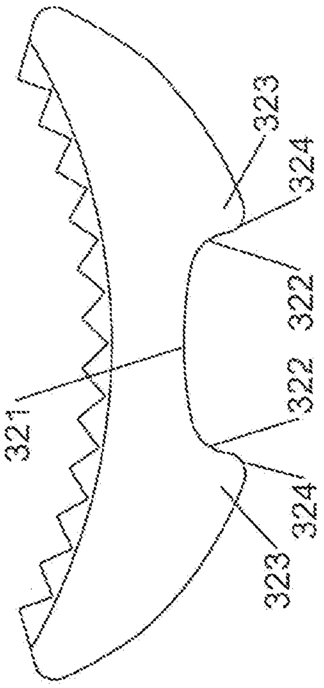
FIG. 4 is a top view of the pawl member as shown in FIG. 3.
Figure 3:
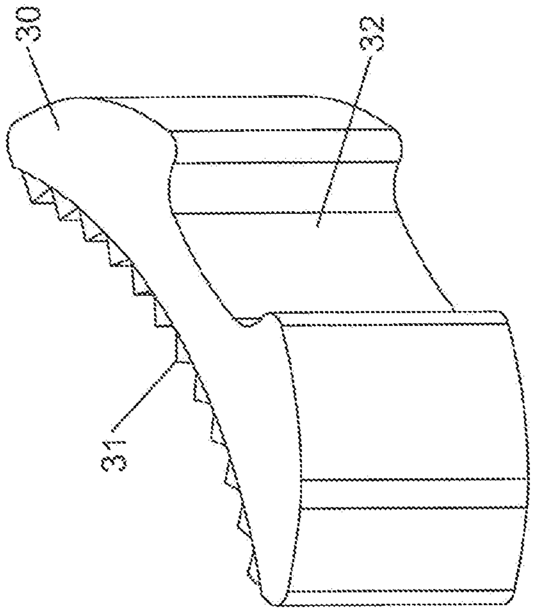
FIG. 3 is a perspective view of a pawl member of the ratchet wrench in accordance with the preferred embodiment of the present invention.

Referring to the drawings and initially to FIGS. 1-7, a ratchet wrench in accordance with the preferred embodiment of the present invention comprises a wrench body 10, a ratchet wheel 20, a pawl member 30, a direction control unit 40, a restriction member 50, and a retaining member 60.

The wrench body 10 is provided with a first receiving recess 11 which has a circular shape and penetrates the wrench body 10. The wrench body 10 is provided with a second receiving recess 12. The second receiving recess 12 has a diameter less than that of the first receiving recess 11 and has a center disposed in the first receiving recess 11. The second receiving recess 12 is connected to the first receiving recess 11. The second receiving recess 12 has a closed top provided with a first abutting face 121 and a closed bottom provided with a second abutting face 122. The wrench body 10 is provided with a third receiving recess 13 connected to the second receiving recess 12. The third receiving recess 13 has an open top and has a depth more than that of the second receiving recess 12. A first pivot portion 131 is formed on a bottom of the third receiving recess 13 and disposed between the second receiving recess 12 and the third receiving recess 13. The wrench body 10 is provided with a circular portion 132 which has a center coinciding with that of the third receiving recess 13. The wrench body 10 is provided with a depression 14 connected to the third receiving recess 13. The third receiving recess 13 has an opening disposed in the depression 14. The depression 14 is provided with a first resting face 141 and a second resting face 142. Each of the first resting face 141 and the second resting face 142 has a planar shape and is not tangent to the circular portion 132. An angle 143 is defined between the circular portion 132, the first resting face 141, and the second resting face 142. The angle 143 is ranged between sixty and one hundred degrees (60°-100°) or ranged between seventy and ninety degrees (70°-90°). The wrench body 10 is provided with a first annular groove 15 close to the opening and connected to the first receiving recess 11. The wrench body 10 has a top provided with an end face 16 having a planar shape.

The ratchet wheel 20 is pivotally mounted in the first receiving recess 11 and has a periphery provided with a ratchet (or toothed) portion 21 having an annular shape. The ratchet wheel 20 is provided with a mounting portion 22. The mounting portion 22 is a polygonal hole for mounting a screw member. The ratchet wheel 20 is provided with a second annular groove 23 aligning with the first annular groove 15.

The pawl member 30 is received in the second receiving recess 12, and is movable leftward and rightward in the second receiving recess 12. The pawl member 30 rests on the first abutting face 121. The pawl member 30 has a first side provided with an engaging portion 31 engaging the ratchet portion 21. The pawl member 30 has a second side having a center provided with a cavity 32 having an arcuate shape. The cavity 32 has a U-shaped configuration and has a first face 321 and two second faces 322. The first face 321 is a concave face and is arranged at a center of the cavity 32. The first face 321 has a single arcuate shape with a diameter. The two second faces 322 are arranged symmetrically at two sides of the first face 321. Each of the two second faces 322 is a concave face. Each of the two second faces 322 has a single arcuate shape with a diameter less than that of the first face 321. Each of the two second faces 322 is tangent to the first face 321. The second side of the pawl member 30 is provided with two first abutting portions 323 arranged symmetrically relative to the cavity 32. The cavity 32 is arranged between the two first abutting portions 323. The cavity 32 has two corners 324. Each of the two second faces 322 is located between the first face 321 and each of the two corners 324.

The direction control unit 40 is pivotally mounted in the third receiving recess 13, and is rotated to move the pawl member 30 leftward and rightward in the second receiving recess 12, so as to control rotation of the ratchet wheel 20. The direction control unit 40 includes a rotation (swivel or turning) member 41, a push member 42, and an elastic member 43.

The rotation member 41 is pivotally mounted in the third receiving recess 13, and has a first end provided with a cylindrical block 411. The cylindrical block 411 extends into the depression 14. The cylindrical block 411 is provided with a drive knob rotatably movable between the first resting face 141 and the second resting face 142. The cylindrical block 411 has a surface flush with the end face 16. The rotation member 41 is provided with a receiving chamber 412. The receiving chamber 412 has a rectangular shape and has an opening facing the cavity 32. The rotation member 41 is provided with two second abutting portions 413 abutting the two first abutting portions 323 and the two corners 324 respectively. The rotation member 41 is provided with a restriction groove 414. The restriction groove 414 is provided with a third face 415. The third face 415 is closer to the first receiving recess 11 than an axis of the rotation member 41. The third face 415 has a planar shape or a convex shape. The rotation member 41 has a second end provided with a second pivot portion 416. The second pivot portion 416 is pivotally mounted on the first pivot portion 131. The restriction groove 414 is disposed between the receiving chamber 412 and the second pivot portion 416.

Figure 11:
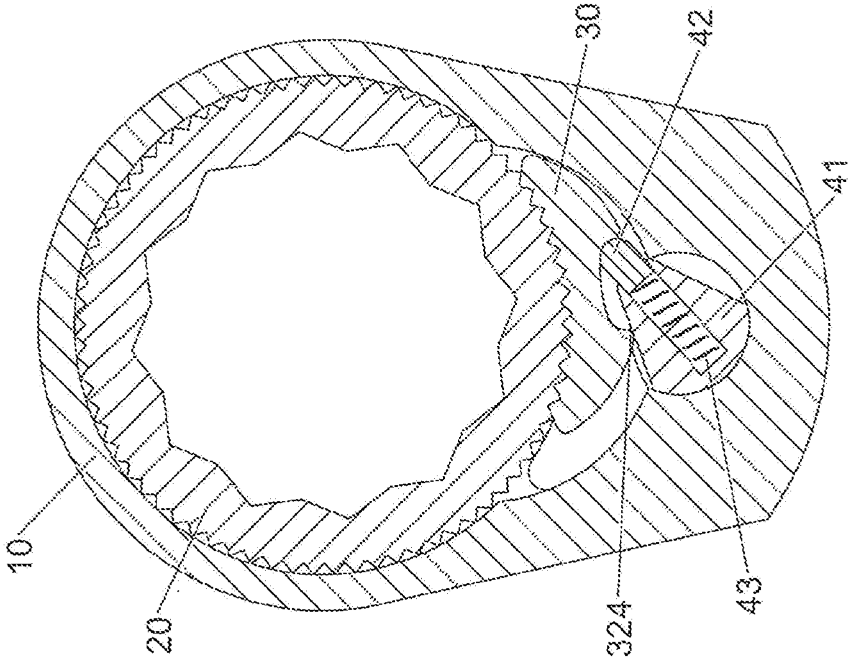
FIG. 11 is a cross-sectional view of the ratchet wrench taken along line B-B as shown in FIG. 10.

Referring to FIG. 11 with reference to FIGS. 1-10, when the pawl member 30 is received in the second receiving recess 12 and the rotation member 41 is received in the third receiving recess 13, the first side of the pawl member 30 rests on an inner face (or a peripheral wall) of the second receiving recess 12, and one of the two first abutting portions 323 on the second side of the pawl member 30 restricts one of the two second abutting portions 413, so that the rotation member 41 is limited by the pawl member 30. Thus, the rotation member 41 is pivotally mounted in the third receiving recess 13, and will not be detached from the wrench body 10.

When the first side of the pawl member 30 rests on the inner face of the second receiving recess 12, a gap is defined between one of the two second abutting portions 413 and one of the two corners 324 on the second side of the pawl member 30. When the wrench body 10 is driven, the wrench body 10 is deformed so that one of the two second abutting portions 413 contacts and pushes one of the two corners 324 on the second side of the pawl member 30. Thus, after the wrench body 10 is driven, the rotation member 41 supports the second side of the pawl member 30. In such a manner, the first side of the pawl member 30 is supported by the second receiving recess 12, and the second side of the pawl member 30 is supported by the rotation member 41, to form a double restriction, so that the engaging portion 31 engages the ratchet portion 21 exactly.

When the pawl member 30 and the direction control unit 40 are mounted in the wrench body 10, the gap is defined between one of the two second abutting portions 413 and one of the two corners 324 before the wrench body 10 is driven, so that one of the two second abutting portions 413 will not contact one of the two corners 324. If the mounting portion 22 has a specification of 19 mm, the gap will not be more than 1 mm. When the wrench body 10 is driven, the wrench body 10 is deformed slightly. A strain gauge is applied on and contacts the wrench body 10 to measure the strain of deformation of the wrench body 10 and to derive the torque value. When the wrench body 10 is driven and deformed, the first receiving recess 11, the second receiving recess 12, and the third receiving recess 13 are also deformed slightly. After the wrench body 10 is deformed, one of the two second abutting portions 413 is driven to contact and push one of the two corners 324. Thus, when the wrench body 10 is driven and deformed, the ratchet wheel 20, the pawl member 30, and the rotation member 41 are forced and deformed.

Alternatively, when the first side of the pawl member 30 rests on the inner face of the second receiving recess 12, one of the two second abutting portions 413 rests on one of the two corners 324 on the second side of the pawl member 30. In such a manner, the first side of the pawl member 30 is pushed and restricted by the second receiving recess 12, and the second side of the pawl member 30 is pushed and restricted by the rotation member 41, to form a double restriction, so that the engaging portion 31 engages the ratchet portion 21 exactly.

Figure 6:
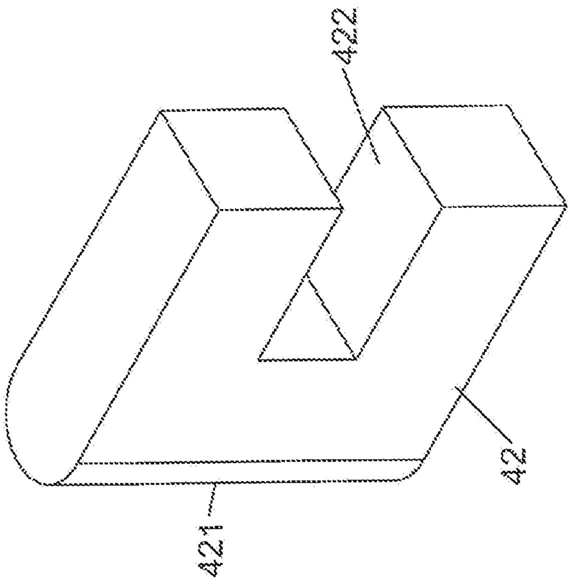
FIG. 6 is a perspective view of a push member of the ratchet wrench in accordance with the preferred embodiment of the present invention.
Figure 5:
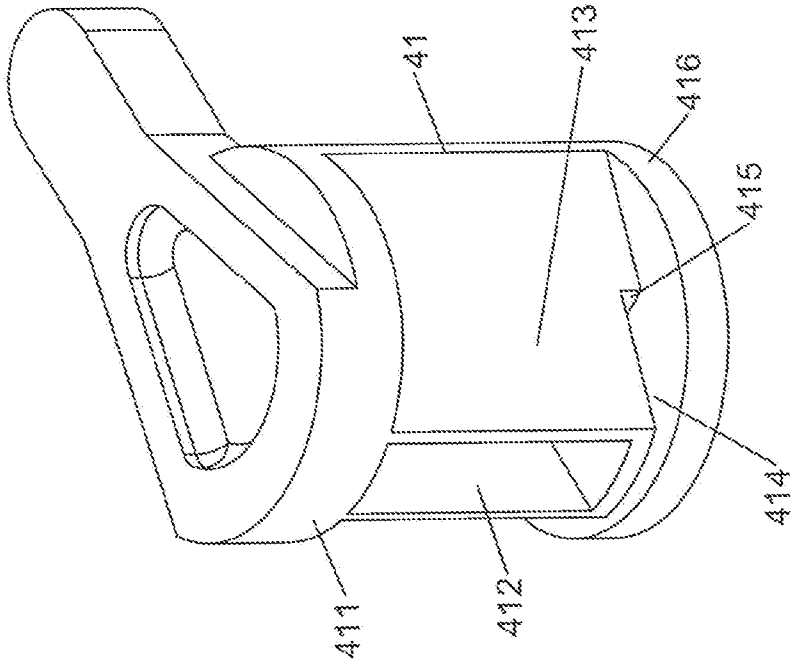
FIG. 5 is a perspective view of a rotation member of the ratchet wrench in accordance with the preferred embodiment of the present invention.
Figure 7:
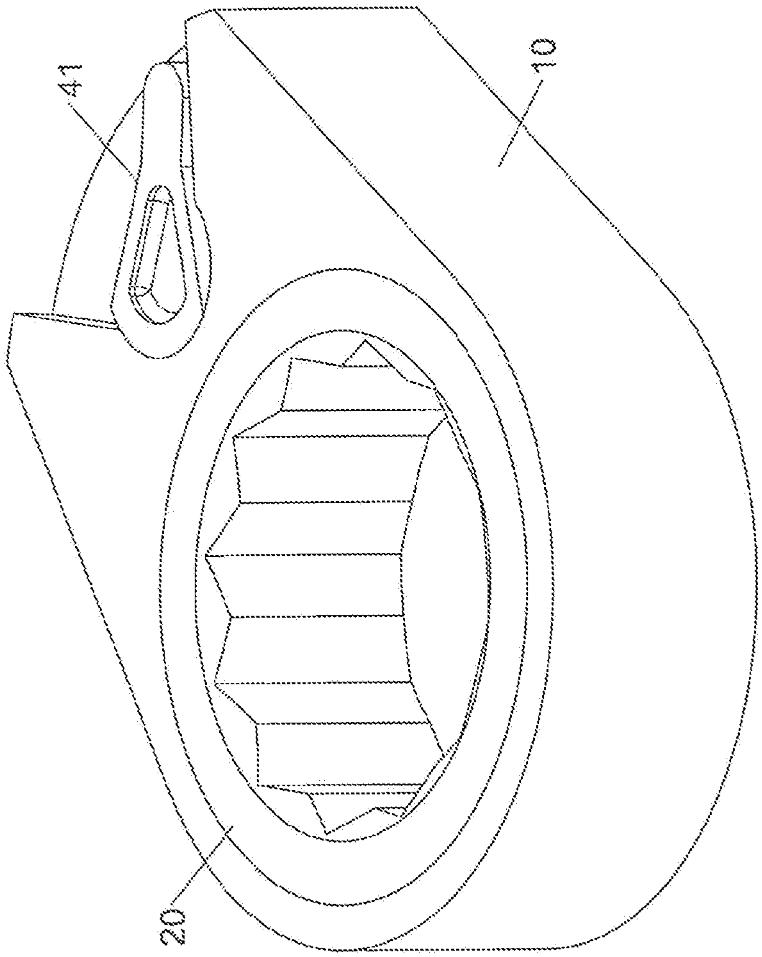
FIG. 7 is a perspective assembly view of the ratchet wrench in accordance with the preferred embodiment of the present invention.
Figure 9:
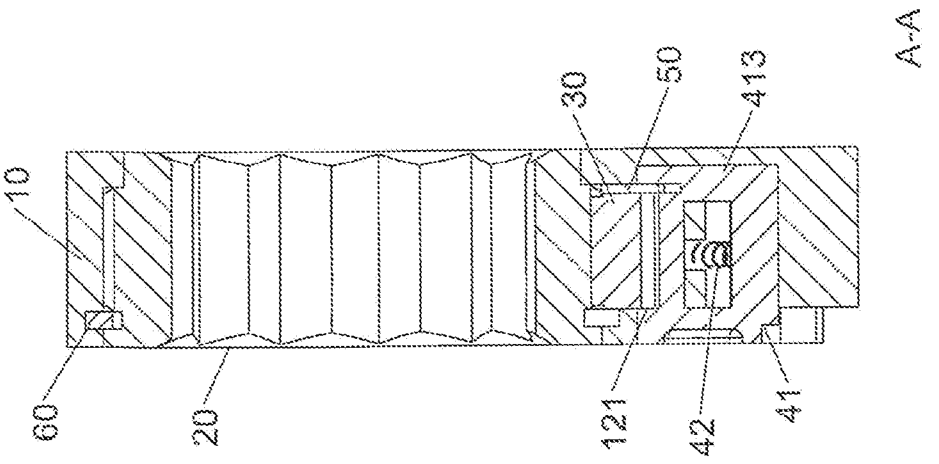
FIG. 9 is a cross-sectional view of the ratchet wrench taken along line A-A as shown in FIG. 8.
Figure 8:
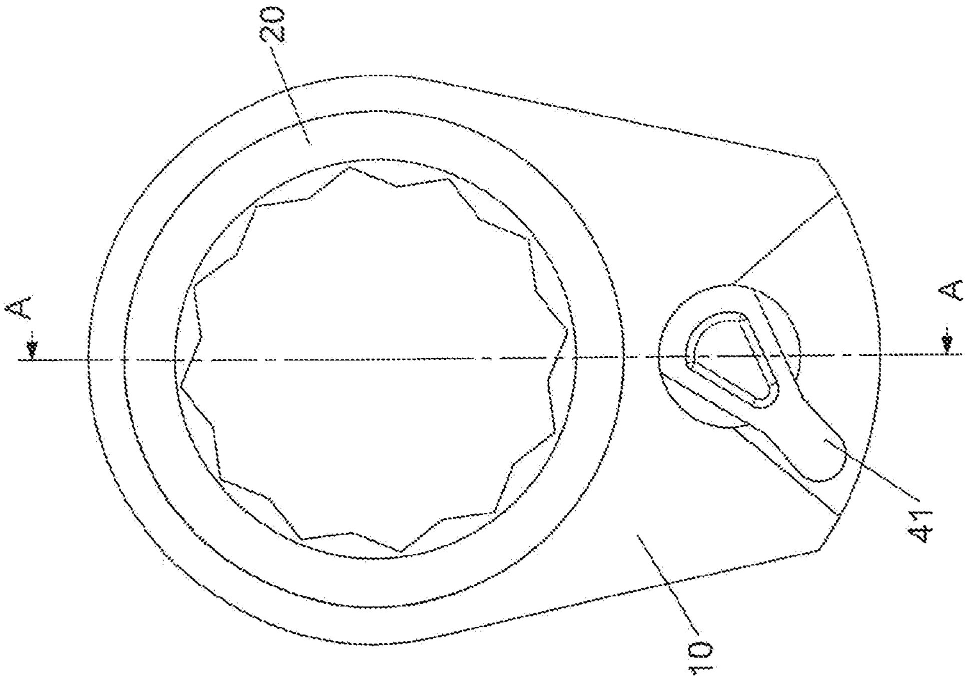
FIG. 8 is a top view of the ratchet wrench as shown in FIG. 7.

Referring to FIGS. 5 and 6 with reference to FIGS. 1-4, the push member 42 has a shape corresponding to that of the receiving chamber 412. The push member 42 has a cuboid shape. The push member 42 is received in the receiving chamber 412 and has a first end provided with a push face 421. The push face 421 is received in the cavity 32 and pushes the cavity 32. The rotation member 41 is rotated to control and move the push member 42 and the pawl member 30, so that the push face 421 rests on one of the two second faces 322, and the pawl member 30 is movable leftward and rightward in the second receiving recess 12. The push face 421 has a single arcuate shape with a diameter equal to that of each of the two second faces 322. When the push face 421 rests on one of the two second faces 322, the push member 42 is restricted by one of the two corners 324, to prevent the push member 42 from being detached from the cavity 32. The push member 42 has a second end provided with a receiving slot 422. The receiving slot 422 has an opening facing and connected to the receiving chamber 412. The receiving slot 422 is distant from the push face 421. The receiving slot 422 is hidden in the receiving chamber 412.

The elastic member 43 is received in the receiving chamber 412 and the receiving slot 422, and biased between the rotation member 41 and the push member 42, to push the push member 42 toward the pawl member 30, such that the push face 421 presses the cavity 32. Preferably, the elastic member 43 is a spring.

The restriction member 50 is assembled with the wrench body 10, the pawl member 30, and the rotation member 41. The restriction member 50 is received in the second receiving recess 12 and has an area almost equal to that of the second receiving recess 12. The restriction member 50 is located between the pawl member 30 and the second abutting face 122. The restriction member 50 is partially received in the restriction groove 414 and rests on the second pivot portion 416 (see FIG. 13). The direction control unit 40 is restricted by the restriction member 50 and limited in the third receiving recess 13. The restriction member 50 is provided with a recessed (or dented) portion 51 aligning with the third receiving recess 13. The recessed portion 51 is directed toward the rotation member 41. The recessed portion 51 is preferably a dent (or depression).

When the rotation member 41 is rotated in the third receiving recess 13, the rotation member 41 is moved in the recessed portion 51. Thus, the restriction member 50 restricts the rotation member 41 to prevent the rotation member 41 from being rotated excessively in the third receiving recess 13. The two second abutting portions 413 limit the maximum rotation angle of the rotation member 41 in the recessed portion 51.

The push member 42 partially extends into the second receiving recess 12, and is restricted by the first abutting face 121. The push member 42 is partially received in the receiving chamber 412. The restriction member 50 is partially received in the restriction groove 414 so that the rotation member 41 is pivotally mounted in the third receiving recess 13.

The retaining member 60 is mounted in the first annular groove 15 and the second annular groove 23, such that the ratchet wheel 20 is retained in the first receiving recess 11 by the retaining member 60. Preferably, the retaining member 60 is a C-shaped snap ring.

Referring to FIGS. 1-9, the ratchet wheel 20 is pivotally mounted in the first receiving recess 11, the pawl member 30 is received in the second receiving recess 12, and the direction control unit 40 is pivotally mounted in the third receiving recess 13, the first pivot portion 131, and the depression 14. The second pivot portion 416 is pivotally mounted on the first pivot portion 131. The direction control unit 40 is rotated to move the pawl member 30 leftward and rightward in the second receiving recess 12, so as to control a two-directional rotation of the ratchet wheel 20. The restriction member 50 is received in the second receiving recess 12. The retaining member 60 is mounted in the first annular groove 15 and the second annular groove 23, such that the ratchet wheel 20 is retained in the first receiving recess 11.

Figure 10:
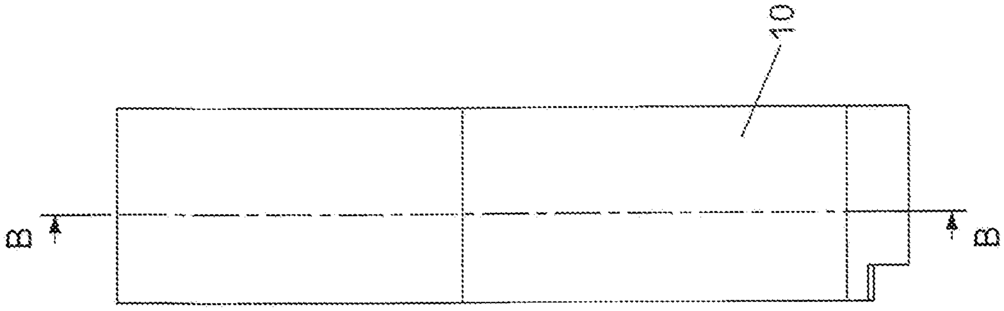
FIG. 10 is a side view of the ratchet wrench in accordance with the preferred embodiment of the present invention.
Figure 12:
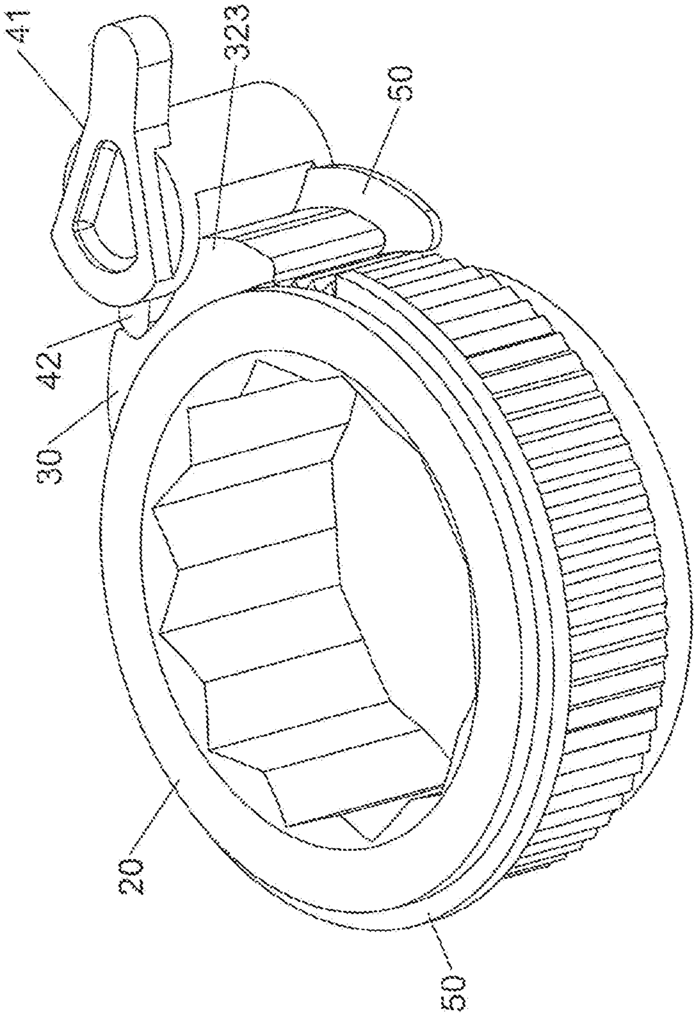
FIG. 12 is a partial perspective view of the ratchet wrench as shown in FIG. 7.

Referring to FIGS. 10-12 with reference to FIGS. 1-9, the pawl member 30 is received in the second receiving recess 12 and rests on the peripheral wall of the second receiving recess 12. The direction control unit 40 is pivotally mounted in the third receiving recess 13, with one of the two second abutting portions 413 resting on the bottom of one of the two first abutting portions 323. The restriction member 50 is partially received in the restriction groove 414. The two second abutting portions 413 limit the maximum rotation angle of the rotation member 41 in the recessed portion 51. The elastic member 43 pushes the push member 42 toward the pawl member 30, such that the push face 421 presses one of the two second faces 322 of the cavity 32. When the rotation member 41 is rotated, the pawl member 30 is controlled and moved leftward and rightward in the second receiving recess 12.

Figure 13:
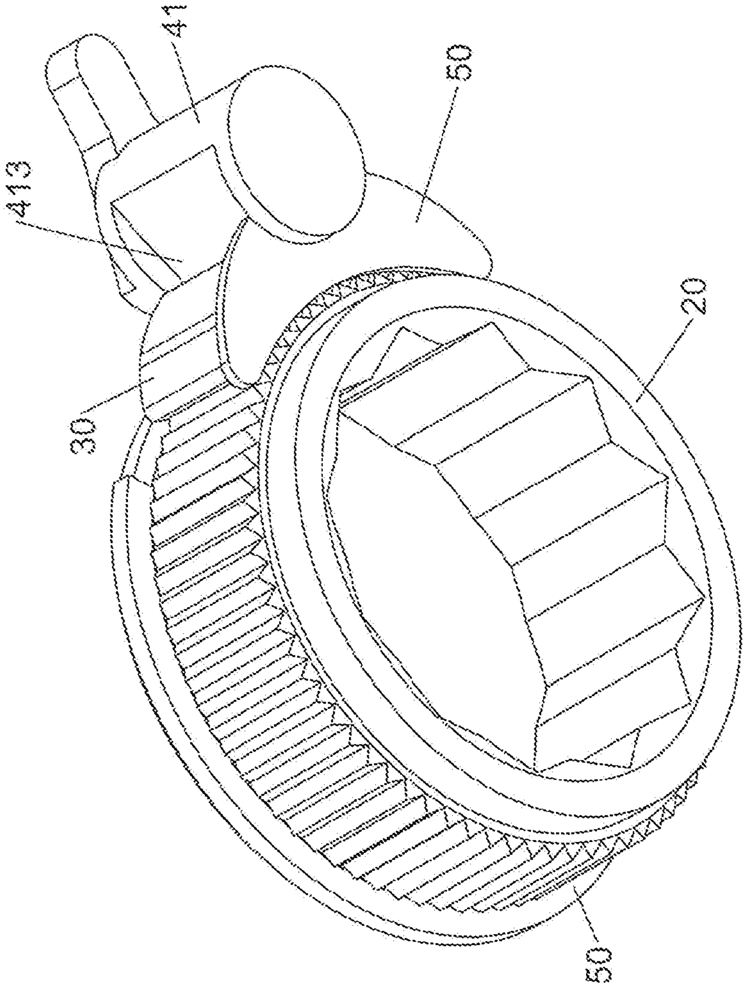
FIG. 13 is a schematic operational view of the ratchet wrench as shown in FIG. 12.
Figure 14:
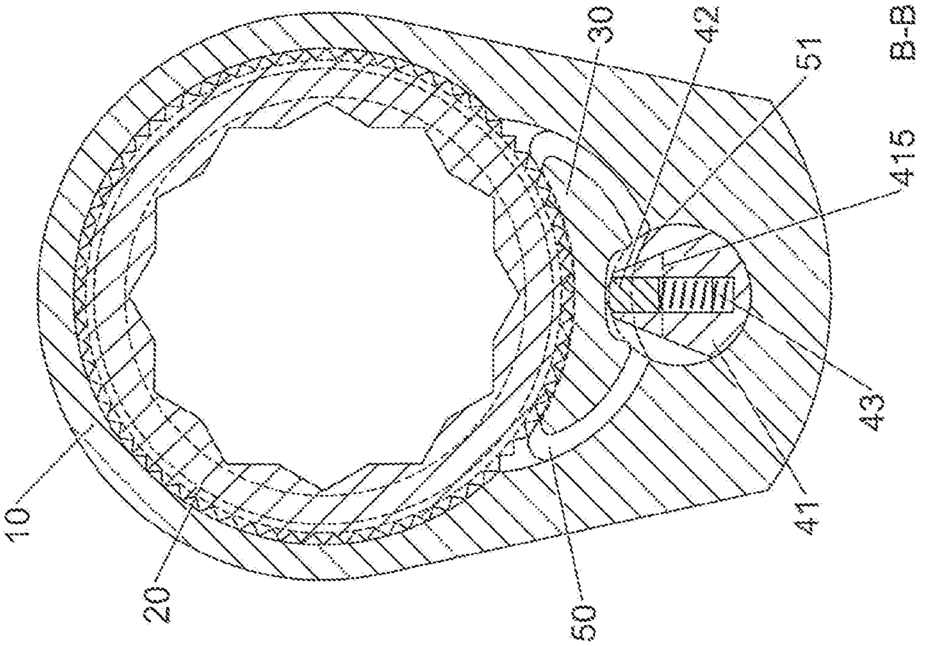
FIG. 14 is a schematic operational view of the ratchet wrench as shown in FIG. 11.

Referring to FIGS. 13 and 14 with reference to FIGS. 1-6, when the rotation member 41 is rotated and drives and moves the pawl member 30 to a position where the pawl member 30 is located at a middle position of the second receiving recess 12, the two ends of the pawl member 30 are detached and spaced from the peripheral wall of the second receiving recess 12, and the engaging portion 31 disengages the ratchet portion 21. At this time, the restriction member 50 is partially received in the restriction groove 414 so that the rotation member 41 is limited by the restriction member 50.

In another preferred embodiment of the present invention, the mounting portion 22 is a square head for mounting a hand tool with a square recess.

Accordingly, the ratchet wrench has the following advantages.

1. The restriction member 50 is partially received in the restriction groove 414 so that the direction control unit 40 is pivotally mounted in the third receiving recess 13 and restricted by the restriction member 50. Thus, the direction control unit 40 is limited by the restriction member 50 at any angle so that the direction control unit 40 is pivotally mounted in the third receiving recess 13 steadily.

2. When the rotation member 41 is rotated in the third receiving recess 13, the rotation member 41 is moved in the recessed portion 51. Thus, the restriction member 50 restricts the rotation member 41 to prevent the rotation member 41 from being rotated in the third receiving recess 13 to an excessive extent. The two second abutting portions 413 limit the maximum rotation angle of the rotation member 41 in the recessed portion 51.

3. The third face 415 is closer to the first receiving recess 11 than the axis of the rotation member 41 so that the rotation member 41 has a larger volume to reinforce the structural strength of the ratchet wrench and to enhance convenience of operation.

4. The first side of the pawl member 30 is supported by the second receiving recess 12, and the second side of the pawl member 30 is supported by the rotation member 41, to form a double restriction, so that the pawl member 30 is limited exactly by the second receiving recess 12 and the rotation member 41. Thus, the engaging portion 31 engages the ratchet portion 21 exactly.

5. The elastic member 43 pushes the push member 42 toward the pawl member 30, such that the push face 421 presses one of the two second faces 322 of the cavity 32. The push face 421 has a diameter equal or close to that of each of the two second faces 322 so that the push face 421 is received in one of the two second faces 322. Thus, when the rotation member 41 is rotated, the push face 421 automatically enters one of the two second faces 322 to provide an automatically positioning effect.

6. The push member 42 is restricted by one of the two corners 324, to prevent the push member 42 from being moved and detached from the cavity 32. Thus, the two corners 324 limit the maximum rotation angle of the push member 42.

7. The push member 42 has a cuboid shape such that the push face 421 and each of the two second faces 322 have a larger contact area. The contact area of the push face 421 and each of the two second faces 322 extends in the height direction of the pawl member 30, such that the push member 42 presses the pawl member 30 efficiently.

8. The push member 42 is a U-shaped body with a larger volume to provide a better structural strength to prevent the push member 42 from being damaged due to hit.

9. Referring to FIG. 12 with reference to FIGS. 1-11, when the pawl member 30 rests on the peripheral wall of the second receiving recess 12, the push member 42 is restricted by the first abutting face 121, the rotation member 41 is restricted by the push member 42, one of the two second abutting portions 413 is restricted by one of the two first abutting portions 323, and the restriction member 50 is partially received in the restriction groove 414, so that the rotation member 41 is restricted by the wrench body 10, the pawl member 30, and the restriction member 50 simultaneously. Thus, the rotation member 41 will not be detached from the third receiving recess 13.

10. Referring to FIGS. 13 and 14 with reference to FIGS. 1-6, when the rotation member 41 drives the pawl member 30 to the position where the pawl member 30 is located at the middle position of the second receiving recess 12, the push member 42 is restricted by the first abutting face 121, the rotation member 41 is restricted by the push member 42, and the restriction member 50 is partially received in the restriction groove 414, so that the rotation member 41 is restricted by the first abutting face 121 and the restriction member 50 simultaneously. Thus, the rotation member 41 is pivotally mounted in the third receiving recess 13.

11. When the rotation member 41 is pivotally mounted in the third receiving recess 13, the rotation member 41 is limited by multiple conditions as illustration of the above-mentioned points 9 and 10, so that an exact pivotal connection is formed between the rotation member 41 is pivotally mounted in the third receiving recess 13.

12. The direction control unit 40 is pivotally mounted in the third receiving recess 13. The cylindrical block 411 is provided with a drive knob extending into the depression 14 and arranged between the first resting face 141 and the second resting face 142. When the rotation member 41 is rotated, the drive knob is moved to the first resting face 141 or the second resting face 142. Thus, the first resting face 141 and the second resting face 142 also limit the rotation angle of the rotation member 41.

13. The second pivot portion 416 is pivotally mounted on the first pivot portion 131, such that the rotation member 41 is mounted in the third receiving recess 13 exactly.

14. The rotation member 41 is pivotally mounted in the third receiving recess 13, and the cylindrical block 411 is received in the depression 14 and has a surface flush with the end face 16, to prevent the user from touching and rotating the rotation member 41 inadvertently when operating the ratchet wrench.

The invention claimed is:

1. A ratchet wrench comprising:

a wrench body, a ratchet wheel, a pawl member, a direction control unit, a restriction member, and a retaining member;

wherein:

the wrench body is provided with a first receiving recess;

the wrench body is provided with a second receiving recess;

the second receiving recess has a diameter less than that of the first receiving recess and has a center disposed in the first receiving recess;

the second receiving recess is connected to the first receiving recess;

the second receiving recess has a top provided with a first abutting face and a bottom provided with a second abutting face;

the wrench body is provided with a third receiving recess connected to the second receiving recess;

the third receiving recess has a depth more than that of the second receiving recess;

a first pivot portion is formed on a bottom of the third receiving recess;

the wrench body is provided with a circular portion which has a center coinciding with that of the third receiving recess;

the wrench body is provided with a depression connected to the third receiving recess;

the third receiving recess has an opening disposed in the depression;

the depression is provided with a first resting face and a second resting face;

the wrench body is provided with a first annular groove connected to the first receiving recess;

the wrench body has a top provided with an end face;

the ratchet wheel is pivotally mounted in the first receiving recess and has a periphery provided with a ratchet portion;

the ratchet wheel is provided with a second annular groove aligning with the first annular groove;

the pawl member is received in the second receiving recess, and is movable in the second receiving recess;

the pawl member rests on the first abutting face;

the pawl member has a first side provided with an engaging portion engaging the ratchet portion;

the pawl member has a second side provided with a cavity;

the cavity has a U-shaped configuration and has a first face and two second faces;

the first face is a concave face and is arranged at a center of the cavity;

the first face has a single arcuate shape with a diameter;

the two second faces are arranged symmetrically at two sides of the first face;

each of the two second faces is a concave face;

each of the two second faces has a single arcuate shape with a diameter less than that of the first face;

the second side of the pawl member is provided with two first abutting portions arranged symmetrically relative to the cavity;
the cavity is arranged between the two first abutting portions;
the cavity has two corners;
each of the two second faces is located between the first face and each of the two corners;
the direction control unit is pivotally mounted in the third receiving recess, and is rotated to move the pawl member, to control rotation of the ratchet wheel;
the direction control unit includes a rotation member, a push member, and an elastic member;
the rotation member is pivotally mounted in the third receiving recess, and has a first end provided with a cylindrical block;
the cylindrical block extends into the depression;
the cylindrical block is provided with a drive knob movable between the first resting face and the second resting face;
the rotation member is provided with a receiving chamber;
the receiving chamber has a rectangular shape and has an opening facing the cavity;
the rotation member is provided with two second abutting portions abutting the two first abutting portions and the two corners respectively;
the rotation member is provided with a restriction groove;
the restriction groove is provided with a third face;
the third face is closer to the first receiving recess than an axis of the rotation member;
the third face has a planar shape or a convex shape;
the rotation member has a second end provided with a second pivot portion;
the second pivot portion is pivotally mounted on the first pivot portion;
when the first side of the pawl member rests on an inner face of the second receiving recess, one of the two first abutting portions on the second side of the pawl member restricts one of the two second abutting portions, so that the rotation member is limited by the pawl member;
the push member has a shape corresponding to that of the receiving chamber;
the push member has a cuboid shape;
the push member is received in the receiving chamber and has a first end provided with a push face;
the push face pushes the cavity;
the rotation member is rotated to move the push member and the pawl member, so that the push face rests on one of the two second faces, and the pawl member is movable in the second receiving recess;
the push face has a single arcuate shape with a diameter equal to that of each of the two second faces;
when the push face rests on one of the two second faces, the push member is restricted by one of the two corners, to prevent the push member from being detached from the cavity;
the push member has a second end provided with a receiving slot;
the receiving slot has an opening facing and connected to the receiving chamber;
the receiving slot is distant from the push face;
the receiving slot is hidden in the receiving chamber;
the elastic member is received in the receiving chamber and the receiving slot, and biased between the rotation member and the push member, to push the push member toward the pawl member, such that the push face presses the cavity;
the restriction member is assembled with the wrench body, the pawl member, and the rotation member;
the restriction member is received in the second receiving recess and has an area almost equal to that of the second receiving recess;
the restriction member is located between the pawl member and the second abutting face;
the restriction member is partially received in the restriction groove;
the direction control unit is restricted by the restriction member and limited in the third receiving recess;
the restriction member is provided with a recessed portion aligning with the third receiving recess;
the recessed portion is directed toward the rotation member;
when the rotation member is rotated in the third receiving recess, the rotation member is moved in the recessed portion;
the restriction member restricts the rotation member to prevent the rotation member from being rotated excessively in the third receiving recess;
the two second abutting portions limit the maximum rotation angle of the rotation member in the recessed portion;
the push member partially extends into the second receiving recess, and is restricted by the first abutting face;
the push member is partially received in the receiving chamber;
the restriction member is partially received in the restriction groove so that the rotation member is pivotally mounted in the third receiving recess; and
the retaining member is mounted in the first annular groove and the second annular groove.

2. The ratchet wrench as claimed in claim 1, wherein:
each of the first resting face and the second resting face has a planar shape;
an angle is defined between the circular portion, the first resting face, and the second resting face; and
the angle is ranged between sixty and one hundred degrees (60°-100°).

3. The ratchet wrench as claimed in claim 1, wherein:
the end face has a planar shape;
the ratchet wheel is provided with a mounting portion;
the mounting portion is a polygonal hole or a square head;
the recessed portion is a dent; and
the retaining member is a C-shaped snap ring.

4. The ratchet wrench as claimed in claim 1, wherein the cylindrical block has a surface flush with the end face.

5. The ratchet wrench as claimed in claim 1, wherein:
when the first side of the pawl member rests on the inner face of the second receiving recess, a gap is defined between one of the two second abutting portions and one of the two corners on the second side of the pawl member;
when the wrench body is driven, the wrench body is deformed, and one of the two second abutting portions contacts and pushes one of the two corners on the second side of the pawl member;
after the wrench body is driven, the rotation member supports the second side of the pawl member; and
the first side of the pawl member is supported by the second receiving recess, and the second side of the pawl member is supported by the rotation member, to form a double restriction, so that the engaging portion engages the ratchet portion exactly.

6. The ratchet wrench as claimed in claim 1, wherein:

when the first side of the pawl member rests on the inner face of the second receiving recess, one of the two second abutting portions rests on one of the two corners on the second side of the pawl member;

the first side of the pawl member is pushed and restricted by the second receiving recess, and the second side of the pawl member is pushed and restricted by the rotation member, to form a double restriction, so that the engaging portion engages the ratchet portion exactly.

7. The ratchet wrench as claimed in claim 1, wherein the elastic member is a spring.

* * * * *